United States Patent [19]

Smentkowski et al.

[11] Patent Number: 4,871,526

[45] Date of Patent: Oct. 3, 1989

[54] HETEROGENEOUS CATALYTIC OXIDATION OF ORGANOPHOSPHONATE ESTERS

[75] Inventors: Vincent S. Smentkowski, Pittsburgh, Pa.; Patrick L. Hagans, Midland, Mich.; John T. Yates, Jr., Allison Park, Pa.

[73] Assignee: University of Pittsburgh of the Commonwealth System of Higher Education, Pittsburgh, Pa.

[21] Appl. No.: 260,478

[22] Filed: Oct. 20, 1988

[51] Int. Cl.[4] .............................................. C01B 25/12

[52] U.S. Cl. .................................. 423/659; 423/245.1; 423/245.3; 423/304; 423/415 A

[58] Field of Search ............. 423/245.1, 245.3, 415 A, 423/304, 659

[56] References Cited

U.S. PATENT DOCUMENTS

| | | | |
|---|---|---|---|
| 3,632,304 | 1/1972 | Hardloon | 423/245.3 |
| 3,810,788 | 5/1974 | Steyermark | 134/42 |
| 3,845,190 | 10/1974 | Yosim et al. | 423/DIG. 12 |
| 4,025,606 | 5/1977 | Acres | 423/245.3 |
| 4,528,170 | 7/1985 | Meier zu Koecker et al. | 423/245.3 |
| 4,529,489 | 7/1985 | McDonald et al. | 204/158 |
| 4,552,667 | 11/1985 | Shultz | 423/210.5 |
| 4,574,714 | 3/1986 | Bach et al. | 423/437 |
| 4,661,329 | 4/1987 | Suzuki et al. | 423/245.3 |
| 4,666,696 | 5/1987 | Shultz | 423/210.5 |

FOREIGN PATENT DOCUMENTS

| | | | |
|---|---|---|---|
| 104634 | 8/1980 | Japan | 423/245.3 |

OTHER PUBLICATIONS

The Surface Chemistry of Organo–phosphorous Compounds (6/15/87), J. G. Ekerdt, K. J. Klabunde, J. R. Shapley, J. M. White and J. T. Yates, Jr.

*Primary Examiner*—John Doll
*Assistant Examiner*—Wayne A. Langel
*Attorney, Agent, or Firm*—Arnold B. Silverman

[57] ABSTRACT

A method of catalytic oxidation of organophosphonate esters includes introducing the organophosphonate esters in gaseous form into contact with a molybdenum catalyst and effecting such introduction in the presence of oxygen to cause the organophosphonate ester to be oxidized on the molybdenum catalyst surface. The process is preferably carried out at a temperature of at least 900° K. in the presence of excess oxygen. A chemisorbed oxide coating or molybdenum oxide coating or both may be established on all or part of the molybdenum catalyst. Among the organophosphonate esters which may be oxidized in this manner are dimethyl methylphosphonate, diisopropyl methylphosphonate, diphenyl methylphosphonate, and other molecules with the structure:

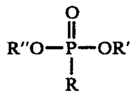

The catalytic oxidation results in emission of carbon monoxide and phosphorus oxides(s) without undesired buildup of carbonaceous or phosphorus overlayers on the Mo catalyst surface.

20 Claims, 5 Drawing Sheets

HETEROGENEOUS CATALYTIC OXIDATION OF ORGANOPHOSPHONATE ESTERS

BACKGROUND OF THE INVENTION

1. Field of the Invention

The present invention relates to a method for catalytic oxidation of organophosphate esters and, more specifically, it relates to such oxidation employing a molybdenum catalyst.

2. Description of the Prior Art

Organophosphonates are used as chemical agents (nerve gas), herbicides, and as industrial chemicals. These materials can have a substantial deliterious effect on the human body as a result of absorption into the body through the skin, ingestion or inhalation. These agents can act on the nervous system or the respiratory system to cause paralysis or other significant damage to the body.

The surface chemistry of organo-phosphorous compounds and the decomposition chemistry thereof through interaction with metal and metal oxide surfaces has been reviewed in "The Surface Chemistry of Organophosphorous Compounds" By J. G. Ekerdt et al., Journal of Physical Chemistry, October, 1988.

It has been known that the compound dimethyl methylphosphonate (DMMP) can serve as an effective model compound for nerve gas research. This facilitates testing without exposing laboratory personnel to the hazards of such compounds, as DMMP has low toxicity.

Molten aluminum has been proposed to react with and deactivate nerve gas agents and certain pesticides. See U.S. Pat. Nos. 4,552,667 and 4,666,696.

U.S. Pat. No. 4,529,489 discloses the use of a laser to decompose organophosphorous chemical agents.

U.S. Pat. No. 3,810,788 discloses methods of decontaminating surfaces or materials contaminated with nerve agents through the use of a strong base in combination with a solvent including dimethyl sulfoxide and a co-solvent such as water or alcohol.

In spite of these prior disclosures, there remains a very real and substantial need for a effective, safe and reliable means for deactivating nerve gas and related environmental pollutants in the atmosphere, in a natural oxidizing environment.

SUMMARY OF THE INVENTION

The present invention has a provided a new solution to the above-described problems by employing a molybdenum catalyst in the presence of oxygen to effect destruction of organophosphonate esters. The process is practiced in the presence of excess oxygen which may advantageously be admixed with the gaseous organophosphonate esters and is preferably conducted at a temperature of at least 900° K. It is envisioned that the air will supply this oxygen.

The molybdenum catalyst surface is partially or totally covered with a layer of chemisorbed oxide or molybdenum oxide or both. This surface oxygen is used in the oxidation chemistry and is continuously resupplied by the air.

Among the materials which may be catalytically oxidized in this manner are materials having the general structure of organophosphonate esters:

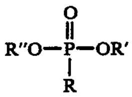

wherein R, R' and R" are any organic functional group.

Examples of specific materials which can be catalytically oxidized are dimethyl methylphosphonate (DMMP), diisopropyl methylphosphonate and diphenyl methylphosphonate.

It is the object of the present invention to provide a reliable and safe method for sustained decomposition of organophosphonate esters through catalytic oxidation.

It is a further object of the invention to provide such a process which may be operated on a continuous basis under steady state oxidizing conditions.

These and other objects of the invention will be fully understood from the following description of the invention on reference to the illustrations appended hereto.

DESCRIPTION OF THE PREFERRED EMBODIMENTS

The present invention involves the catalytic oxidation of organophosphonate esters in order to destroy them and render them harmless to people and vegetation.

In general the method contemplates introducing the organophosphonate esters in gaseous form to a molybdenum catalyst. The process is effected in the presence of oxygen which may advantageously be provided from the air. In this manner, the organophosphonate ester will be oxidized by the molybdenum catalyst and will result in the emission of carbon monoxide and phosphorous oxide(s).

Effectiveness of the method on dimethyl methylphosphonate (DMMP), which is frequently employed as a safe model for nerve gas, results because of the close relationship between the molecular structure and elemental composition of the compounds. Also, by employing DMMP, laboratory personnel and others need not be exposed to the risk of direct exposure to nerve gas.

In one preferred practice of the invention, the molybdenum catalyst may be presented in the form of a mesh which is heated to at least 900° K. by any desired means such as electrical heating, for example. The mesh size and geometry are generally established such that no significant number of gas molecules of the organophosphonate will pass there through it without encountering a molybdenum catalyst surface at elevated temperatures. The admixture of the organophosphonate ester and oxygen may be caused to impinge upon the mesh so as to facilitate efficient interaction therebetween.

Examples of alternate approaches would be to employ a packed column containing molybdenum mesh at elevated temperature or use of a supported molybdenum catalyst.

It is believed that the catalytic reaction may be achieved only with an oxide coating which is preferably continuous on the molybdenum surface of either the chemisorbed oxygen type or molybdenum oxide or a combination thereof.

It is presently believed that the reaction involves dimethyl methylphosphonate in the presence of oxygen being converted into $H_2O+CO+$ a volatile PO species (such as $P_2O_5$, for example).

EXAMPLE

In order to confirm the effectiveness of the invention, a series of tests were performed employing a Mo(110) single crystal as the catalyst.

Figure 1:
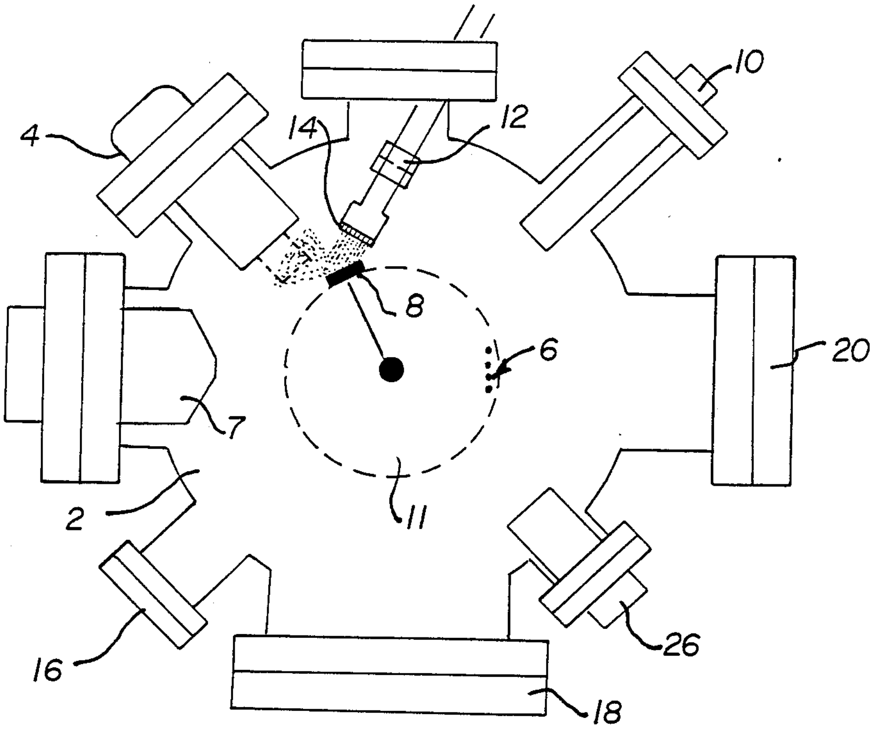
FIG. 1 is a schematic illustration of a form of equipment employed in performing tests of the present invention.

The apparatus employed in the experiment as illustrated in FIG. 1 was an ultra-high vacuum (UHV) system. The stainless steel chamber 2 contained a Dycor M100M digitized and multiplexed quadrupole mass spectrometer (QMS) 4 having a mass range of 1 to 140 amu, a Perkin Elmer single pass CMA Auger spectrometer 7, a tungsten helix 6 for electron bombardment of the Mo(110) crystal 8, an argon sputtering gun 10, and an off axis micro-capillary array collimated beam gas doser 14 containing a pinhole aperture 12. The chamber pressure was maintained at $1\times10^{-10}$ torr through the use of a Leybold-Heraeus 150 l/s turbo pump, a Varian 270 l/s diode Vac Ion pump and a Varian titanium sublimation pump which were connected to the chamber 2. The chamber pressure was monitored using a Granville Phillips Series 271 ionization gauge 26. Covered ports 16, 18 and 20 were provided.

Gas could be delivered directly to the crystal by means of the micro-capillary array gas doser or to the chamber through a leak valve. Pressure in the gas line was monitored using a MKS type 221-A, 0–100 torr Baratron pressure gauge. For the Auger studies of surface layer formation, a pinhole aperture, nominally approximately 2 microns in diameter which was obtained from Buckbee Mears Company was used to control the effusion rate of the gas to the crystal through the doser. At the equilibrium DMMP vapor pressure behind the pinhole apperture, the flux of DMMP was measured to be $3.4\times10^{13}$ molecule/cm$^2$ minute. For the mass spectrometry experiments, the pinhole aperture nominally about 6 microns in diameter was used to increase the flux of DMMP to $6.6\times10^{13}$ molecules/cm$^2$ minute. These fluxes include a geometrical factor of 0.247, calculated from the doser-crystal geometry. In addition, for long exposures using the larger pinhole aperture, the DMMP flux to the crystal drops by 5 percent/hour due to the depletion of DMMP pressure in gas storage region.

The Mo(110) crystal 8 was cut to provide a disk 2 mm thick and 12 mm in diameter which was provided with 0.25 mm slots cut in the top and bottom for mounting. The crystal was prepared using 600 grit silion carbide sandpaper followed by 9 micron and 3 micron diamond polish on nylon. Final polishing was carried out by using 0.05 micron alumina on a polishing cloth. This procedure established a mirror finish with no visible scratches. The orientation of the crystal was determined to be within one degree of the desired orientation (110) by Laue back reflection x-ray diffraction.

Figure 2:
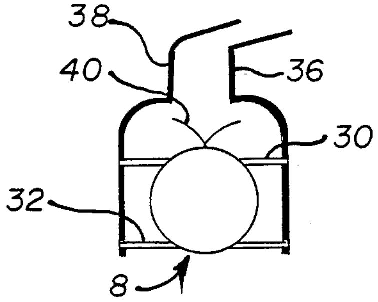
FIG. 2 is a schematic illustration showing mounting of the molybdenum (110) crystal in the apparatus.

The crystal was mounted and resistively heated using 0.25 mm diameter tungsten wire 30, 32 through the slots which were cut into the crystal. The 0.25 mm tungsten support and heating wires were spot welded to two 1.4 mm diameter tungsten wire leads 36, 38 as shown in FIG. 2. Heating of the crystal to temperatures in excess of 1,500° K. was possible using this mounting configuration. The crystal temperature was measured using a 0.075 mm diameter W-5% Re vs W-26% Re thermocouple 40 spot welded to the back of the crystal. This provided the actual temperature of the reacting surface plus or minus 2° K.

DMMP of 99.4 percent purity was obtained from Morton Thiokol, Inc. Impurities were said to include 0.4 percent trimethylphosphonate, 0.004 percent trimethylphosphonite and 0.2 percent water. The DMMP was further purified by performing five freeze-pump-thaw cycles, wherein continuous pumping was carried out on warming. After the fourth cycle, the DMMP vapor pressure remained constant at 0.074 torr at 301.6° K.

The Mo(110) surface was cleaned of any phosphorus, carbon and oxygen following each exposure to DMMP by $Ar^+$ sputtering at 1,000° K. followed by annealing at 1,200° K.

A series of experiments employing the apparatus shown in FIGS. 1 and 2 was conducted using a molecular beam containing a 1:2 DMMP/oxygen flux ratio. The admixture of the DMMP gas and oxygen was introduced into the chamber 2 through the doser pinhole aperture 12 and microcapillary array collimated beam doser 14.

Figure 3:
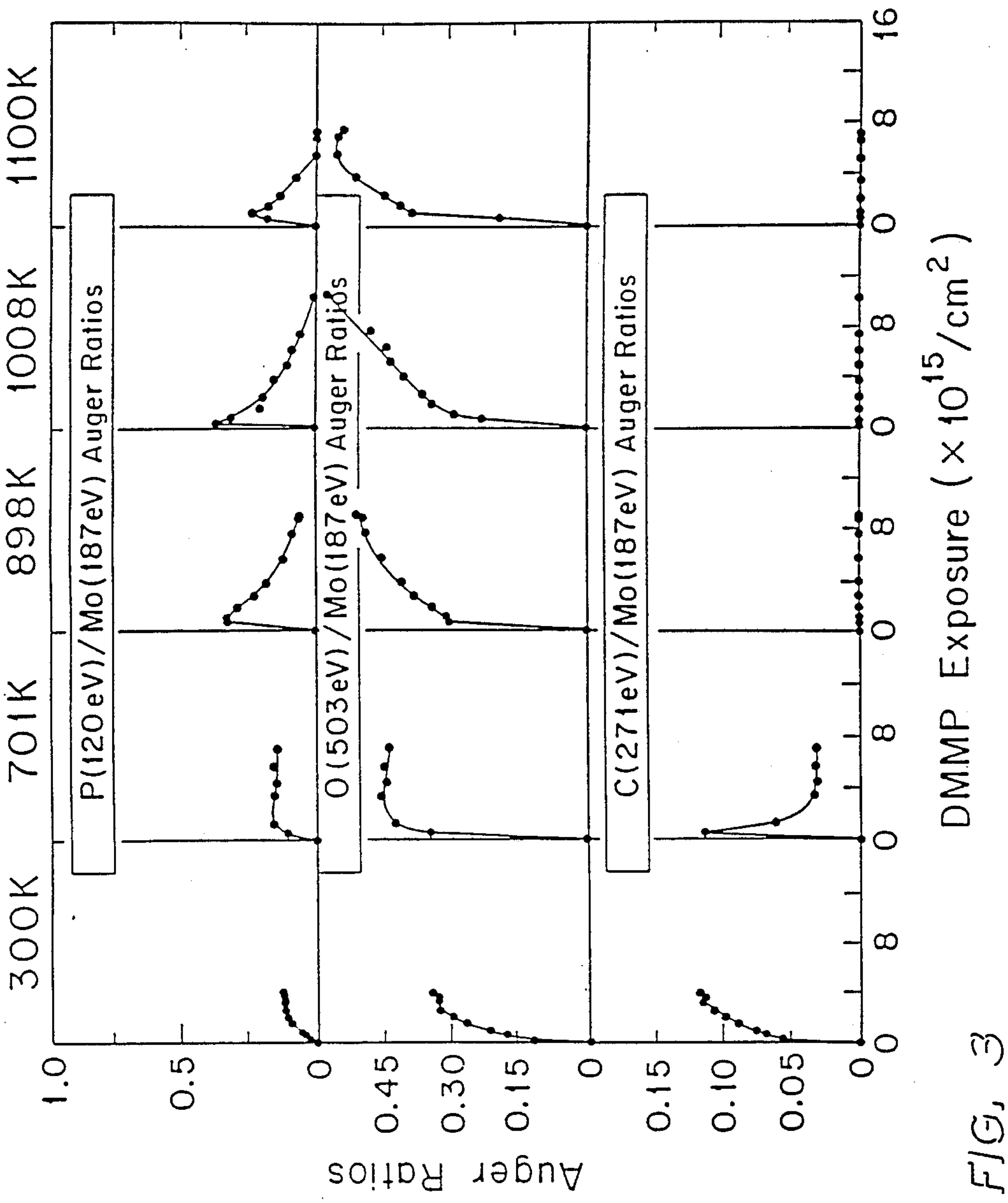
FIG. 3 illustrates results of Auger spectroscopic examinations of the process practiced at different temperatures on the molybdenum (110) crystal.
Figure 6:
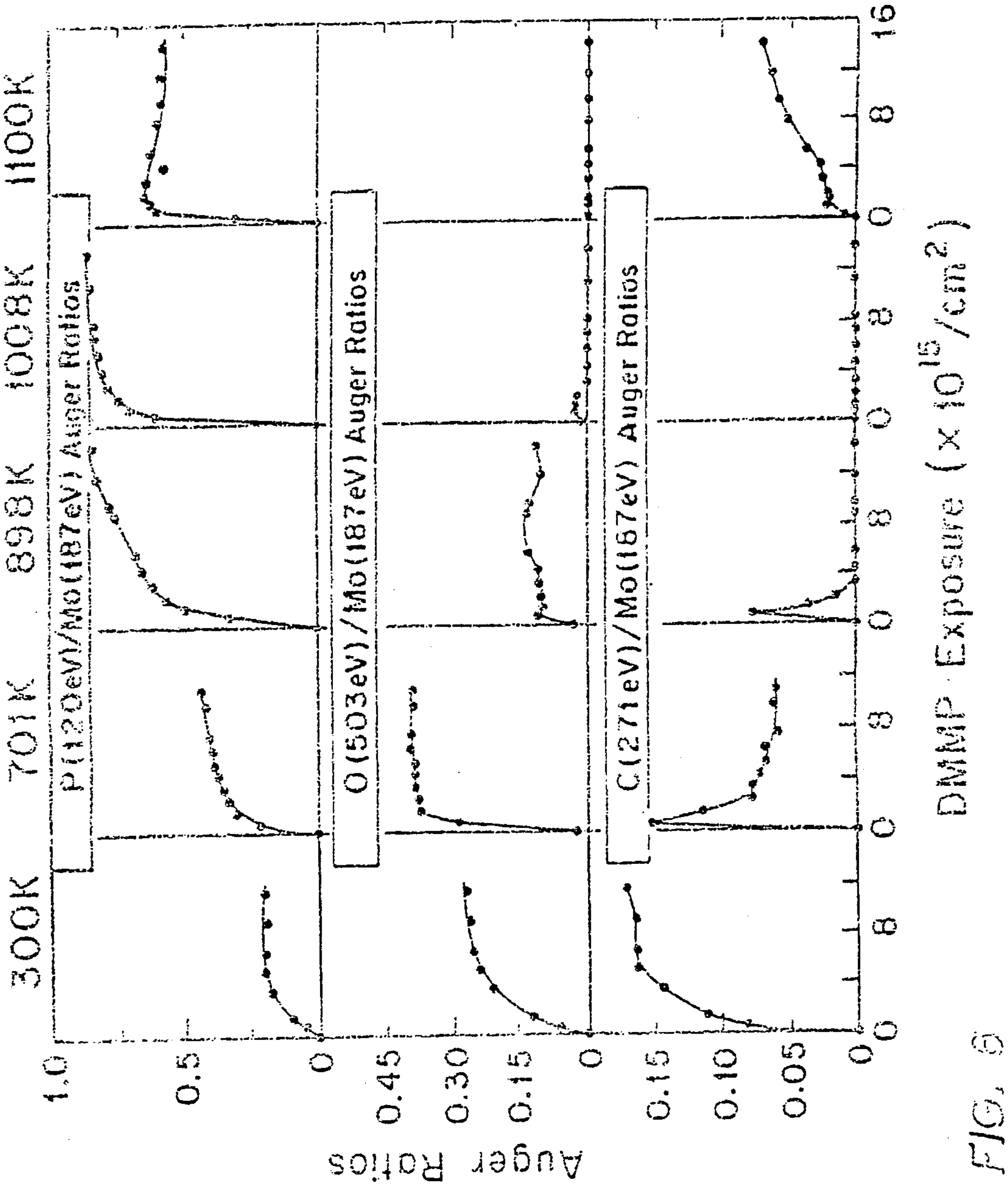
FIG. 6 shows a series of plots illustrative of the carbon, phosphorous, and oxygen buildup on the molybdenum surface in the absence of oxygen in the gas phase.

During this set of Auger experiments, the Mo(110) disk was at the following temperatures: 300° K., 701° K., 898° K., 1,008° K. and 1,100° K. Plots of the Auger elemental ratios against the exposure of DMMP at different temperatures are shown in FIG. 3. At temperatures of 701° K. and below, the steady state Auger ratios in FIG. 3 qualitatively resemble those obtained in experiments using pure DMMP without a mixture with oxygen (FIG. 6). At 898° K., a surface reaction occurred which caused the phosphorus signal to increase initially and then to decrease to zero as the DMMP/oxygen dose continued to be provided. After obtaining steady state, at temperatures of about 900° K. and above, only oxygen was present on the crystal. The surface carbon was oxidized to carbon monoxide while the surface phosphorus was believed to be oxidized to volatile phosphorous oxide(s).

Figure 4:
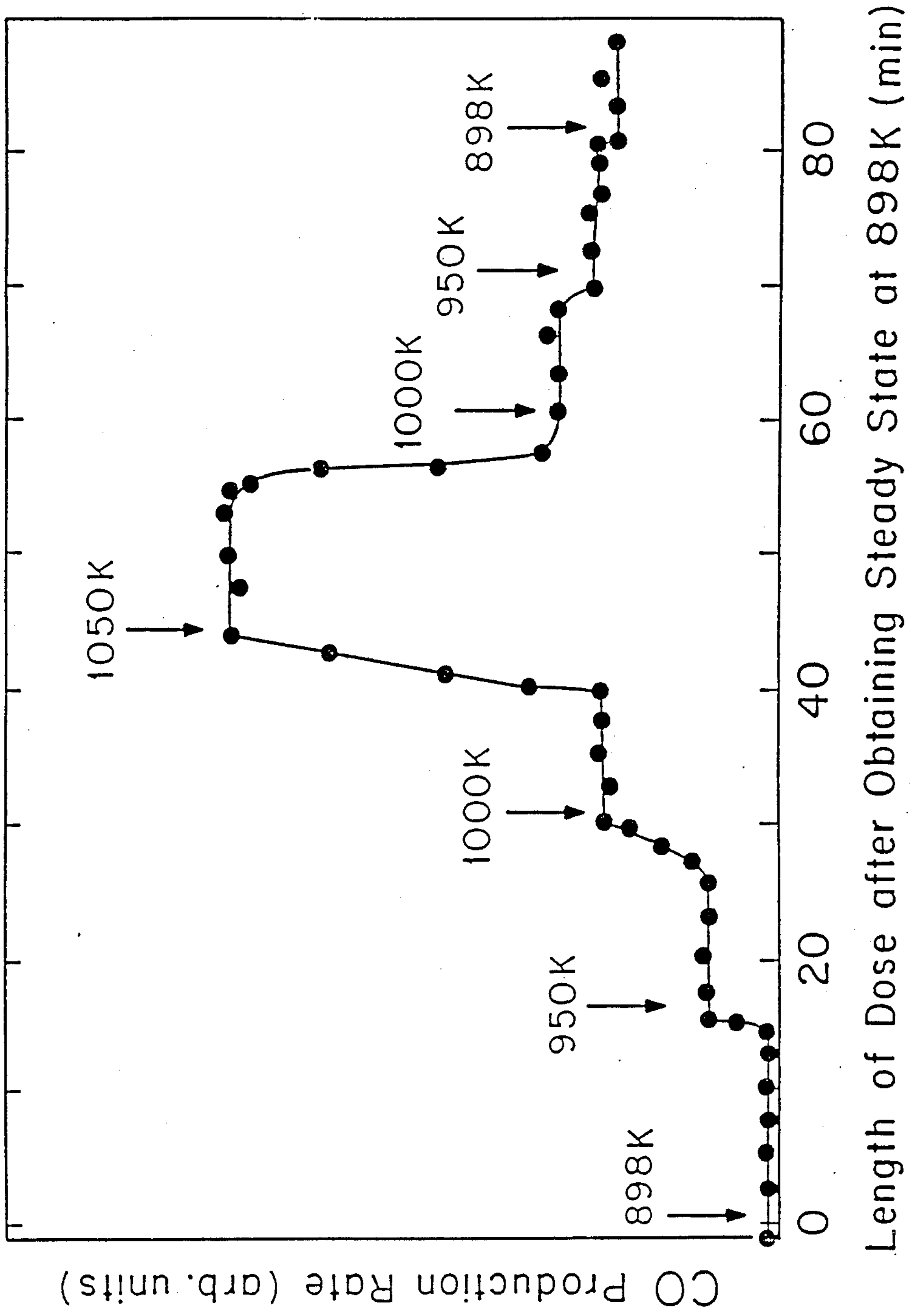
FIG. 4 is a plot of carbon monoxide evolution at different temperatures due to DMMP oxidation.

A series of tests were conducted to determine the effect of temperature on the rate of carbon monoxide evolution from the Mo(110) crystal 8 as measured by the flux of carbon monoxide observed by the mass spectrometer 4 when the crystal is positioned in the molecular beam. The crystal was exposed to the DMMP/oxygen gas mixture at 898° K. for four hours in order to make sure that a steady state surface condition was achieved. The temperature was then increased and a new steady state value of carbon monoxide production was reached. As is shown in FIG. 4, the crystal was heated to 950° K., 1,000° K., and 1,050° K. followed by cooling in stages to 1,000° K., 950° K. and 898° K. An increase in the rate of carbon monoxide production was observed as the temperature was increased to 950° K.

and 1,000° K. However, it was observed that the rate of carbon monoxide production was increased by a large increment as the temperature was increased from a 1,000° K. to 1,050° K. After the crystal was cooled from the maximum temperature of 1,050° K. into the range of 1,000° K. to 898° K., the rate of steady state carbon monoxide production was sufficiently greater than it was (at the same temperature) before being heated to 1,050° K. This suggests that irreversible effects occur above about 1,050° K. on the Mo(110) surface, leading to an increase in the catalytic efficiency of the surface.

Figure 5:
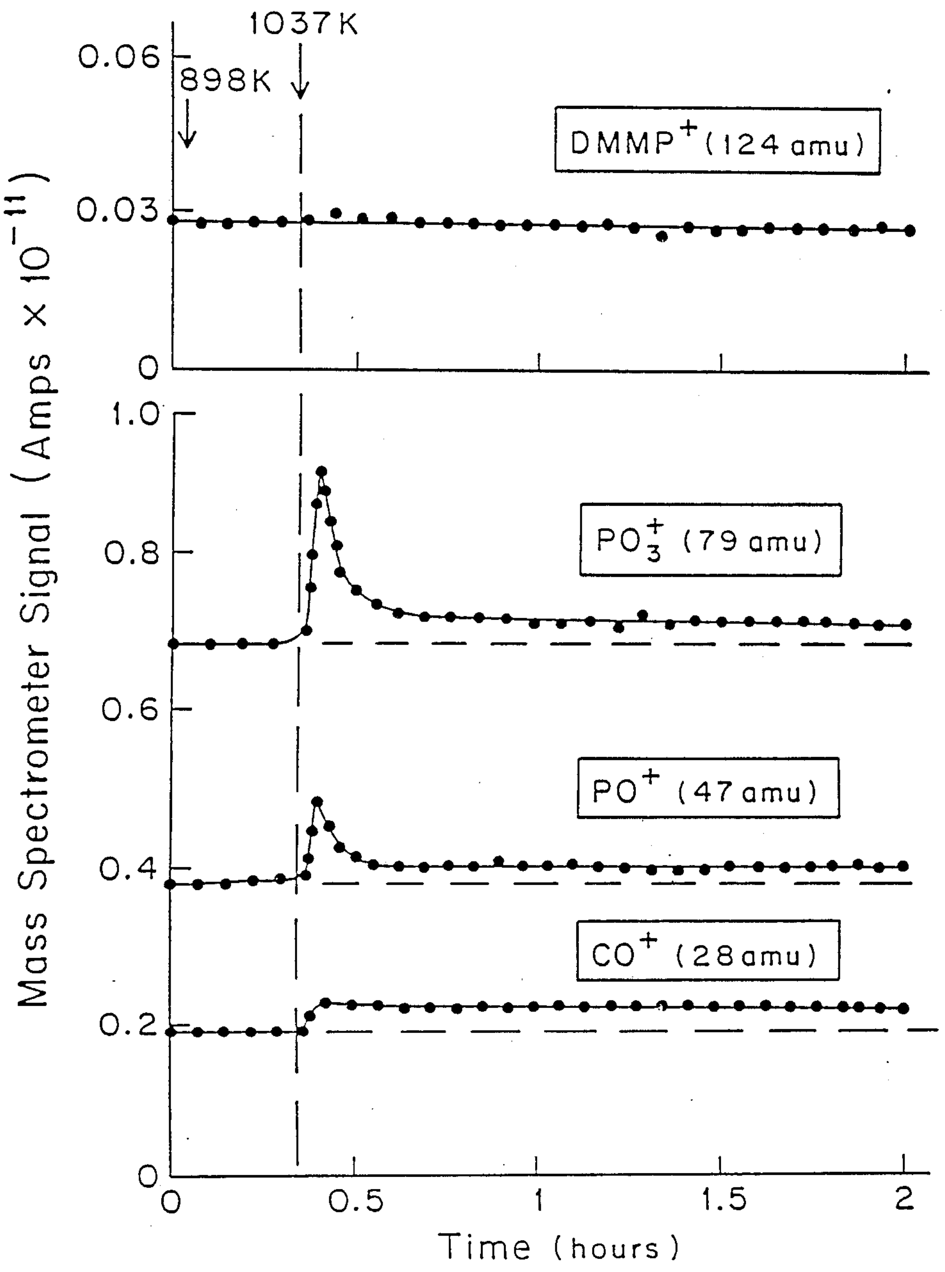
FIG. 5 illustrates the effect of temperature variation on the carbon monoxide and phosphorous oxide oxidation products.

Referring now to FIG. 5, experiments similar to that described and illustrated with respect to FIG. 4 were performed except that the experiment involved the use of an initial temperature of 898° K. with a rapid increase to a temperature level of 1,037° K. The phosphorous oxide evolution (as monitored by $PO_3^+$ and $PO^+$) increased significantly after the temperature was raised and there was an increase in the carbon monoxide production as monitored by the mass spectrometer 4. After 5 minutes the phosphorous oxide signals reached a maximum value and after 12 minutes, dropped to a steady state value slightly above their initial value at 898° K. The DMMP flux into the mass spectrometer remained essentially constant throughout these experiments.

While the $PO^+$ and $PO_3^+$ are produced in the cracking pattern of pure DMMP, the increase in the signals of these two ions was not accompanied by an increase in the DMMP signal. The $PO^+$ and $PO_3^+$ ions are, therefore, believed to be the result of phosphorous oxide(s) liberated from the Mo(110). The loss of phosphorus from this surface by this process provides additional surface reaction sites and, therefore, increases the catalytic activity of the Mo(110) crystal. This results in higher steady state production of CO and phosphorous oxide species at 1,037° K. as compared to 898° K. as shown in FIGS. 4 and 5. Based upon cracking pattern evaluation of DMMP, $PO^+$ $PO_3^+$, the DMMP signal would have increased by $0.021\times10^{-11}$A if the increase in $PO^+$ and $PO_3^+$ signals were due to the evolution of DMMP and not to the evolution of phosphorous oxide species. Clearly, this is not the case. This confirms the existence of catalytic behavior.

The Auger spectroscopy evaluation has indicated that an oxide overlayer exists on the Mo(110) surface under steady state conditions following exposure to a DMMP/oxygen gas mixture. The maximum catalytic activity is achieved when an oxide overlayer, which contains little surface phosphorous and may have exposed Mo sites, is employed.

Tests conducted in the absence of oxygen show that DMMP decomposes on Mo(110) above approximately 700° K. leaving an overlayer consisting mostly of phosphorus which may be present in the form of molybdenum phosphide.

Experiments were performed to determine whether a 13 minute pre-treatment of the molybdenum surface with oxygen would improve the process. In one set of tests the molybdenum catalyst was subjected to oxygen exposure prior to exposure to the DMMP/oxygen beam. In the other set of tests the molybdenum catalyst was exposed directly to the DMMP/oxygen beam without prior exposure to oxygen. When the reaction products were evaluated by mass spectroscopy, in the former case, the reflected flux of the DMMP increased sharply and then started to decrease into a rather shallow minimum and rather stable production rates of $PO^+$ and $PO_3^+$ were obtained. In the latter case, this initial sharp (transient) increase was absent. After four hours in both sets of tests, the doser was turned off and the $DMMP^+$, $PO^+$ and $PO_3^+$ signals returned to their base line values. As the oxygen pretreatment length was increased, an increase in the transient $DMMP^+$, $PO^+$, and $PO_3^+$ was achieved when the oxidized crystal was introduced into the DMMP/oxygen gas stream. The steady state levels achieved was found to be independent of the length of the pre-treatment. It is essential that the process be practiced in the presence of oxygen which facilitates establishing oxide coatings on molybdenum and with the molybdenum catalyst being substantially devoid of phosphorus and carbon on the surface thereof.

Referring to FIG. 6, it will be seen that oxygen is required in order to effect catalytic destruction of organophosphonate esters. FIG. 3 shows that at temperatures above about 898° K., in the presence of oxygen, there is no significant buildup of carbon or phosphorus on the molybdenum. FIG. 6 shows the result when oxygen is not present. At temperatures above 898° K., there was substantial phosphorus buildup and within certain temperature ranges, significant carbon buildup on the molybdenum.

It will be appreciated, therefore, that the present invention provides an effective means for catalytic oxidation of organophosphonate esters to decompose the same. Molybdenum is employed to destroy molecules of the general structure.

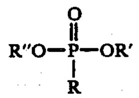

wherein R, R' and R" are any organic functional groups. All of this is accomplished in an efficient manner which facilitates long-term continuous treatment.

Whereas particular embodiments of the invention have been described above for purposes of illustration, it will be evident to those skilled in the art that numerous variations of the details may be made without departing from the invention as defined in the appended claims.

We claim:

1. A method of catalytic oxidation of organophosphonate esters comprising,
   introducing said organophosphonate esters in gaseous form into contact with a molybdenum catalyst and in the presence of oxygen, whereby said organophosphonate esters will be oxidized by said molybdenum catalyst.

2. The method of claim 1 including,
   effecting said catalytic reaction at a temperature of at least about 900° K.

3. The method of claim 2 including,
   admixing said oxygen with said organophosphonate esters prior to effecting contact between said organophosphonate esters with said molybdenum catalyst.

4. The method of claim 3 including,
   providing said oxygen in excess quantity with respect to said organophosphonate esters.

5. The method of claim 4 including,
   employing air as the source of said oxygen.

6. The method of claim 4 including, employing dimethyl methylphosphonate as said organophosphonate.

7. The method of claim 4 including,
employing diisopropyl methylphosphonate as said organophosphonate.

8. The method of claim 4 including,
employing diphenyl methylphosphonate as said organophosphonate.

9. The method of claim 4 including,
emitting carbon monoxide and phosphorous oxide responsive to said catalytic oxidation.

10. The method of claim 9 including,
employing molybdenum as said molybdenum catalyst.

11. The method of claim 4 including,
providing said molybdenum catalyst as a supported molybdenum catalyst.

12. The method of claim 4 including,
providing said molybdenum catalyst in mesh form.

13. The method of claim 12 including,
heating said molybdenum catalyst mesh to a temperature of at least 900° K.

14. The method of claim 13 including,
electrically heating said molybdenum catalyst mesh.

15. The method of claim 13 including,
establishing a layer of oxide on the surface of said molybdenum catalyst.

16. The method of claim 15 including,
establishing said oxide layer as a substantially continuous coating.

17. The method of claim 15 including,
establishing said oxide layer as a discontinuous coating.

18. The method of claim 15 including,
establishing said oxide layer at least in part as chemisorbed oxygen.

19. The method of claim 15 including,
establishing said oxide layer at least in part as molybdenum oxide.

20. The method of claim 15 including,
maintaining the surface of said molybdenum catalyst substantially free of phosphorous and carbon.

* * * * *

UNITED STATES PATENT AND TRADEMARK OFFICE

CERTIFICATE OF CORRECTION

PATENT NO. : 4,871,526

DATED : October 3, 1989

INVENTOR(S) : VINCENT S. SMENTKOWSKI, ET AL.

It is certified that error appears in the above-identified patent and that said Letters Patent is hereby corrected as shown below:

On the Title Page, first column, after the title, the following should be inserted:

--Government Support: This invention was made with Government support under Contract DAAL03-86-K0005 awarded by the Department of the Army. The Government has certain rights in this invention.--

Signed and Sealed this

Seventh Day of July, 1992

*Attest:*

DOUGLAS B. COMER

*Attesting Officer*

*Acting Commissioner of Patents and Trademarks*